(12) United States Patent
Fite

(10) Patent No.: US 7,317,306 B2
(45) Date of Patent: Jan. 8, 2008

(54) NONLINEAR ADAPTIVE VOLTAGE POSITIONING FOR DC-DC CONVERTERS

(75) Inventor: Robert J. Fite, Olympia, WA (US)

(73) Assignee: Intel Corporation, Santa Clara, CA (US)

( * ) Notice: Subject to any disclaimer, the term of this patent is extended or adjusted under 35 U.S.C. 154(b) by 76 days.

(21) Appl. No.: 09/476,219

(22) Filed: Dec. 30, 1999

(65) Prior Publication Data

US 2002/0001208 A1  Jan. 3, 2002

(51) Int. Cl.
*G05F 1/40* (2006.01)
(52) U.S. Cl. .............. 323/284; 323/275; 323/285; 363/74
(58) Field of Classification Search ............ 363/16, 363/17, 19, 21, 25, 74, 78, 97, 131, 98, 285, 363/280; 323/222, 282, 283, 284, 274, 273, 323/275
See application file for complete search history.

(56) References Cited

U.S. PATENT DOCUMENTS

| | | | | |
|---|---|---|---|---|
| 5,949,222 A | * | 9/1999 | Buono | 323/222 |
| 5,999,433 A | * | 12/1999 | Hua et al. | 363/17 |
| 6,031,749 A | * | 2/2000 | Covington et al. | 363/98 |
| 6,064,187 A | * | 5/2000 | Redl et al. | 323/285 |
| 6,130,526 A | * | 10/2000 | Yang et al. | 323/284 X |
| 6,188,211 B1 | * | 2/2001 | Rincon-Mora et al. | 323/280 |

* cited by examiner

*Primary Examiner*—Jessica Han
(74) *Attorney, Agent, or Firm*—Schwegman, Lundberg, Woessner & Kluth, P.A.

(57) ABSTRACT

The present invention provides a nonlinear adaptive voltage positioning DC-DC converter method and apparatus that enable improved voltage transient response under changing current conditions for a load with known current draw characteristics. The invention in some embodiments provides that the nonlinear adaptive voltage positioning be adaptable or configurable to a specific, known current load range that comprises less than the full current range that may be provided by the DC-DC converter, to optimize voltage transient response for a particular known load.

15 Claims, 4 Drawing Sheets

NONLINEAR ADAPTIVE VOLTAGE POSITIONING FOR DC-DC CONVERTERS

FIELD OF THE INVENTION

The invention relates generally to DC electric power conversion, and more specifically to use of a nonlinear voltage output in response to varying current load in DC-DC converters.

BACKGROUND

Power supplies in electronic devices such as computer systems typically output at least one direct current (DC) electric power signal, used to power the various electronic components comprising the electronic device. This electric power signal is distributed throughout most circuits, and used to power various circuit elements including amplifiers, digital logic, and discrete circuitry. But, it is not uncommon for each of these devices to require a different power supply voltage, making the task of producing and distributing power signals of proper voltages to each component difficult.

For example, many amplifier circuits require 15 volts potential or more in supplied power, and digital logic often requires only 5 volts. Many newer low-voltage digital logic devices operate on power supplied at even lower voltages, including 3.3 volts and 2.5 volts in some devices. Mixing devices requiring various voltage levels in a single electronic device not only requires ensuring input and output signals from the various components are at proper voltage levels, but also requires ensuring that power is supplied at all voltages needed by the various components.

One solution to the problem is to use a circuit known as a DC-DC converter, which includes a broad class of electronic circuits that convert DC power supplied at a certain potential or voltage to DC power at a different voltage. Use of multiple DC-DC converters in an electronic device provides the ability to support a variety of DC voltage requirements for various devices without requiring multiple power supplies.

Because DC-DC converters are usually relied upon to provide a specified DC output voltage that remains within the voltage requirements of electronic circuits, they are typically designed to provide a voltage that remains within a specified voltage range over an anticipated range of load conditions. For example, a rapid increase in current drawn often causes a temporary undesired reduction in output voltage of a DC-DC converter. This voltage drop must be accurately characterized, so that the DC-DC converter can be relied upon to maintain an adequate output voltage for a specified maximum increase in current drawn. Similarly, a rapid decrease in current drawn can result in a temporary undesired increase in output voltage, which must be similarly characterized to ensure that the voltage increase does not exceed the voltage range required by the electronic circuitry.

One solution to the problem of regulating the output voltage in changing current conditions is to utilize an adaptive voltage positioning DC-DC converter that has an intentionally varying output voltage for different current loads, such that the output voltage is at a relatively low potential under a high current load and at a relatively high potential under a no current load. A change in current load will then cause the output voltage to temporarily change in a direction that is compensated for by the variable output voltage, as is explained in greater detail herein. But, the design of such DC-DC converters does not anticipate that certain load devices may draw typical current loads that do not span a full range of maximum current draw to no current draw but rather typically draw current in a narrow range of currents the DC-DC converter can provide, making a linear adaptive voltage response less than optimal for those applications.

What is needed is a nonlinear adaptive voltage positioning method and apparatus for a DC-DC converter that enable improved voltage transient response under changing current conditions for a load with known current draw characteristics that do not span the entire range of current the DC-DC converter is capable of providing.

SUMMARY OF THE INVENTION

The present invention provides a nonlinear adaptive voltage positioning DC-DC converter method and apparatus that enable improved voltage transient response under changing current conditions for a load with known current draw characteristics. The invention in some embodiments provides that the nonlinear adaptive voltage positioning be adaptable or configurable to a specific, known current load range that comprises less than the full current range that may be provided by the DC-DC converter, to optimize voltage transient response for a particular known load.

DETAILED DESCRIPTION

In the following detailed description of sample embodiments of the invention, reference is made to the accompanying drawings which form a part hereof, and in which is shown by way of illustration specific sample embodiments in which the invention may be practiced. These embodiments are described in sufficient detail to enable those skilled in the art to practice the invention, and it is to be understood that other embodiments may be utilized and that logical, mechanical, electrical, and other changes may be made without departing from the spirit or scope of the present invention. The following detailed description is, therefore, not to be taken in a limiting sense, and the scope of the invention is defined only by the appended claims.

The present invention provides a nonlinear adaptive voltage positioning method and apparatus for a DC-DC converter that enable improved voltage transient response under changing current conditions for a load with known current draw characteristics. The invention in some embodiments provides that the nonlinear adaptive voltage positioning be adaptable or configurable to a specific, known current load range that comprises less than the full current range that may be provided by the DC-DC converter, to optimize transient response for a particular known load.

Figure 1:
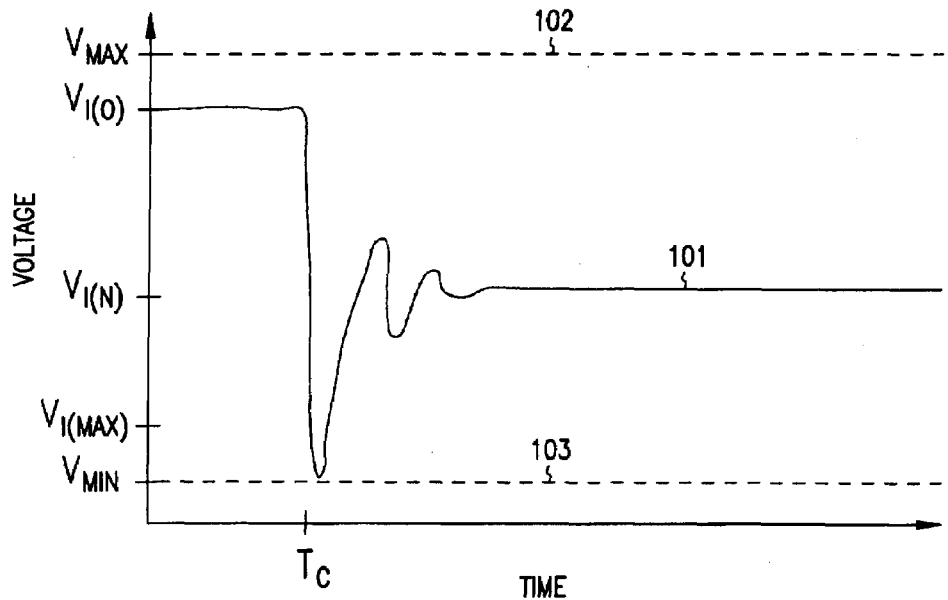
FIG. 1 shows the voltage response of a typical adaptive voltage positioning DC-DC converter as current draw is increased.

FIG. 1 illustrates the operation of a typical DC-DC converter that employs adaptive voltage positioning. The Y-axis of FIG. 1 represents voltage output from the DC-DC converter, and the X-axis represents time. Before time Tc, the DC-DC converter is providing no current at a corresponding voltage level VI(0), as indicated by voltage output line 101. At time Tc, the current drawn increases, causing a temporary drop and oscillation in the voltage output 101 as it stabilizes to a new voltage level VI(n) corresponding to the new current drawn. The voltage provided before time Tc is a relatively high voltage because it is known that a drop and oscillation in voltage will occur as shown by voltage output 101 when current drawn from the DC-DC converter is increased. This high voltage value at a no current condition allows such a drop and oscillation in voltage to occur while maintaining a voltage output level in a predefined acceptable voltage window defined in FIG. 1 by Vmax and Vmin.

Figure 2:
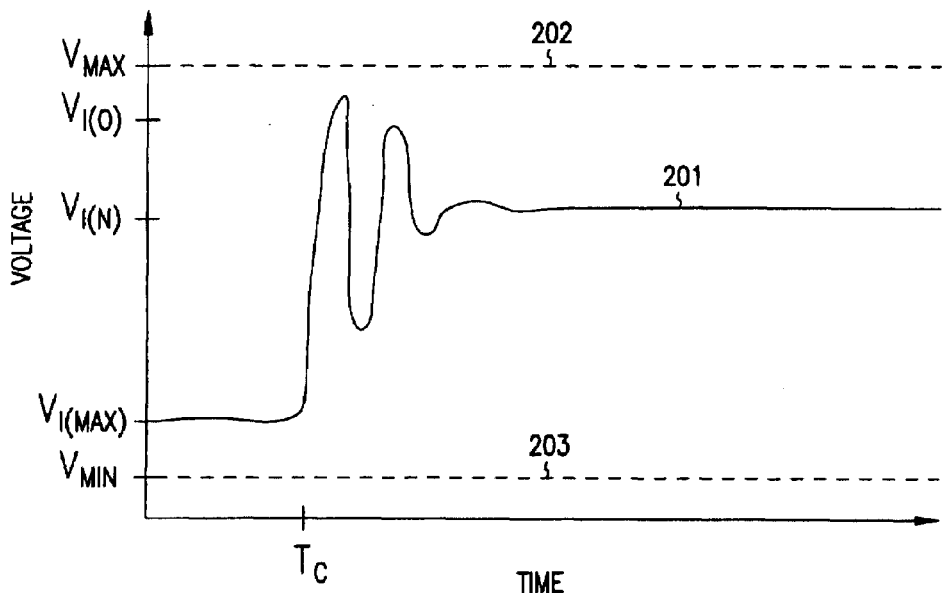
FIG. 2 shows the voltage response of a typical adaptive voltage positioning DC-DC converter as current draw is decreased.

FIG. 2 illustrates the opposite case, where a high current drawn from the DC-DC converter changes at time Tc to a lower drawn current. Before time Tc, voltage output 201 is at a low level VI(max), corresponding to a desired voltage provided at a maximum current output level. At time Tc the current drawn decreases, and the voltage rises and oscillates before settling at new voltage level VI(n) which corresponds to the desired voltage for the new current output level. Again, the oscillating voltage remains within a predefined acceptable voltage window defined in FIG. 2 by Vmax at 202 and Vmin at 203 because the low chosen output voltage VI(max) provided at the maximum current output compensates for the anticipated increase and oscillation of the voltage output 201 upon a decrease in current output.

Figure 3:
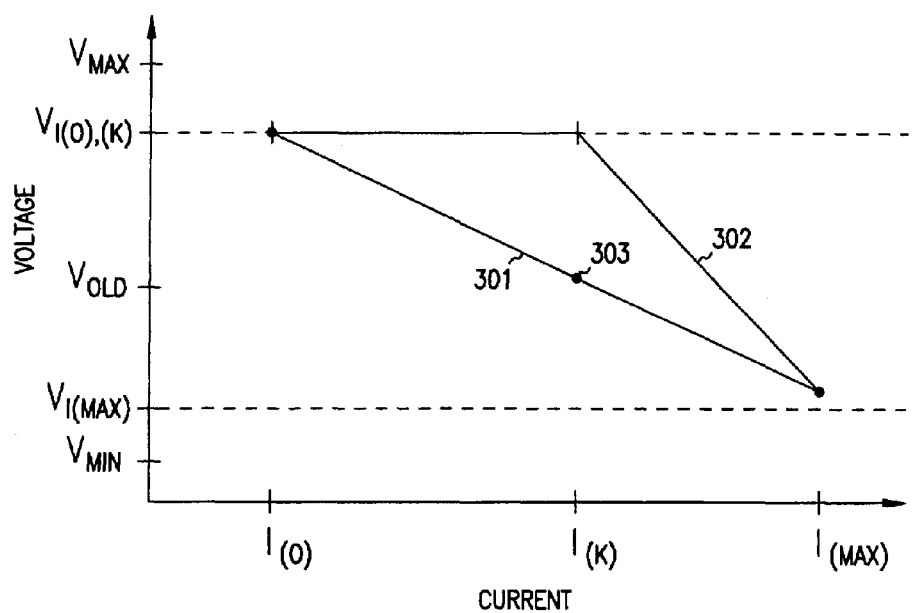
FIG. 3 illustrates the desired voltage versus current output relationship of both a typical adaptive voltage positioning DC-DC converter and an embodiment of the nonlinear adaptive voltage positioning DC-DC converter of the present invention.

FIG. 3 illustrates the voltage v. current relationship of the prior art as shown in FIGS. 1 and 2, and also shows the modification made to the voltage v. current relationship in the present invention. The X-axis represents various levels of current drawn from the DC-DC converter, and the Y-axis represents the voltage provided by the DC-DC converter at various current levels. Line 301 characterizes a typical adaptive voltage positioning DC-DC converter, which varies the output voltage as a linear function of the current drawn. Such a converter provides a high voltage VI(0) at no current output I(0) and a low voltage VI(max) at a high current load I(max) as illustrated in FIGS. 1 and 2, and a linearly varying voltage in between current levels as shown by line 301.

But, many common load devices do not vary in operation between a no current and a maximum current state, reducing the ability of the adaptive voltage positioning DC-DC converter to compensate for current changes by manipulating the output voltage. The present invention provides a solution to this problem by use of a nonlinear voltage-current relationship, as is shown by example curve 302.

When the current drawn is equal to or less than a minimum load current level I(k), the voltage output remains at a high voltage level VI(k), which corresponds to the minimum current voltage level. The minimum current voltage level VI(k) is the voltage at a nonzero minimum current level I(k) rather than a zero current level I(o), as is shown in FIG. 3. Only once the drawn current exceeds the minimum load current level does the voltage output begin to drop, finally reaching a low voltage level VI(max) at a maximum current draw level I(max). Because the voltage only varies over the range of expected current variance from I(k) to I(max), the full voltage window from Vmax to Vmin can be used to compensate for oscillations in current changes over the expected current variance range. In contrast, use of a traditional voltage versus current relationship as shown at curve 301 would result in a voltage variance only extending between V(old) and VI(max) for the same current variation between I(k) and I(max), resulting in a greatly reduced ability to compensate for voltage oscillation within the defined acceptable voltage window as the DC-DC converter changes current output levels.

Figure 4:
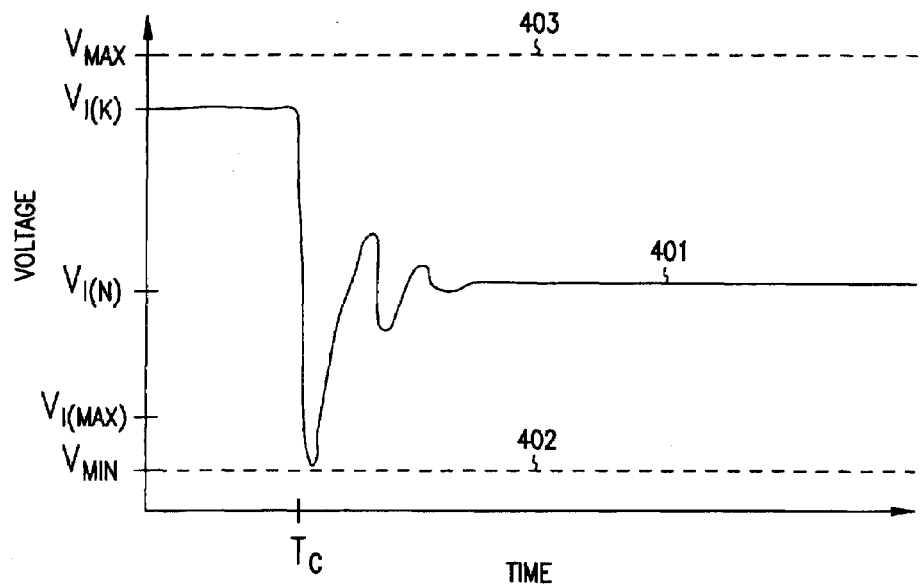
FIG. 4 shows the voltage response of a nonlinear adaptive voltage positioning DC-DC converter as the current draw is increased, consistent with an embodiment of the present invention.

FIG. 4 illustrates one example of operation of a nonlinear adaptive voltage positioning DC-DC converter, consistent with an embodiment of the present invention. Before time Tc, the converter is operating at a low current output I(k), which is higher than the zero current output that is the lowest anticipated current output of a traditional linear adaptive voltage positioning DC-DC converter. As the current changes from current output level I(k) to current output level I(n) at time Tc, the voltage represented by line 401 drops from level VI(k) to level VI(n), oscillating as the output voltage becomes stable. The voltage again stays within the allowable voltage window defined by Vmin at 402 and Vmax at 403, due to the elevated voltage level VI(k) in anticipation of oscillations in voltage signal 401 as the drawn current is increased.

Figure 5:
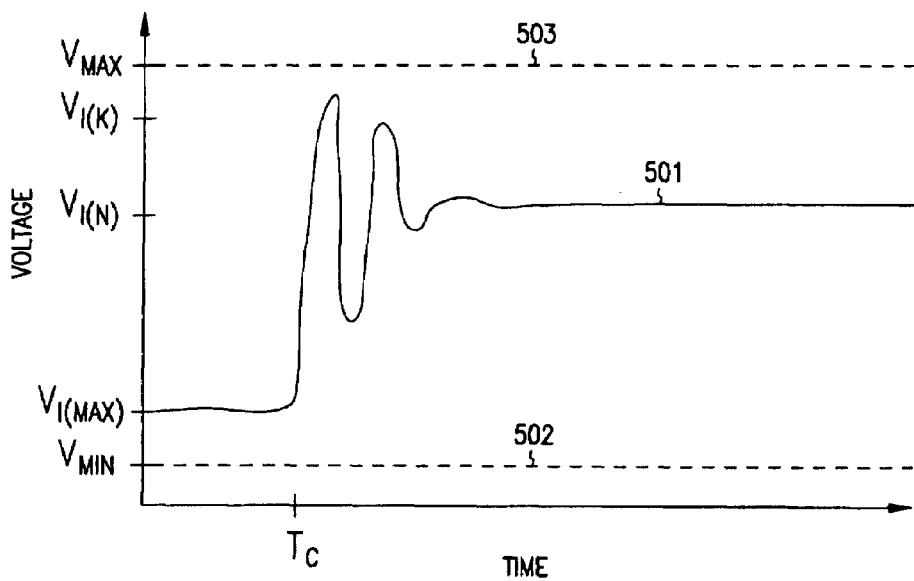
FIG. 5 shows the voltage response of a nonlinear adaptive voltage positioning DC-DC converter as the current draw is decreased, consistent with an embodiment of the present invention.

Similarly, FIG. 5 shows an example of operation of the nonlinear adaptive voltage positioning of the present invention, where the current drawn is decreased from I(max) to an arbitrary new value I(n). At time Tc, the voltage VI(max) corresponding to a maximum output current I(max) is changed to a new voltage level VI(n) corresponding to a new reduced current load I(n). The voltage signal 501 therefore changes at time Tc from voltage level VI(max) to VI(n), increasing rapidly in response to the decreased current draw and oscillating as the output voltage becomes stable. Again, the voltage remains within the allowable voltage variation window defined in FIG. 5 by Vmin at 502 and Vmax at 503, due to the reduced voltage level VI(max) at maximum current output in anticipation of a rapid rise in voltage output upon a decrease in current drawn.

DC-DC converters typically temporarily drop in output voltage when current draw is increased and rise in output voltage when current draw is decreased due to the inability of the DC-DC converter to respond instantaneously to changes in current requirements. Various impedances in the output of the DC-DC converter and the energy stored therein resist a rapid change in current supplied by the DC-DC converter, resulting in very fast voltage swings that are eventually sensed and compensated for by the control circuitry of the DC-DC converter. The present invention compensates for these voltage swings as explained relative to FIGS. 3, 4 and 5 by anticipating the voltage swings that will occur as a result of change in drawn current, and moving the voltage output within the voltage window to reduce the chance the voltage swings will cause the output voltage to vary outside the allowable voltage output window.

Selection of the various voltage levels is dependent on the specific application, and the components used to build the apparatus. For example, VI(k) is selected to be somewhat below Vmax in the embodiment of the invention illustrated in FIG. 4 despite knowing that any current change will result in a very rapid drop in voltage because component tolerances and an acceptable level of ripple are allowed in the circuitry that produces the output voltage. This means that VI(k) must be selected somewhat lower than Vmax to allow for this output voltage ripple and component variation. Similarly, VI(max) is selected above Vmin in FIG. 5 to compensate for allowable component variations and output voltage ripple, while keeping the output voltage within the acceptable voltage output window.

Also, selection of the minimum load current level I(k) is dependent on the anticipated minimum load current of a particular application or load device. For example, a processor that draws from 1.7 to 3 amps in operation may have in some embodiments a selected I(k) minimum load current level of 1.7 amps. In practice, a benefit will be realized by utilizing the nonlinear adaptive voltage positioning function of the present invention if any value of I(k) greater than zero amps is chosen, due to the resulting increase in voltage variance allowable between the minimum load current level and the maximum current load level.

Figure 6:
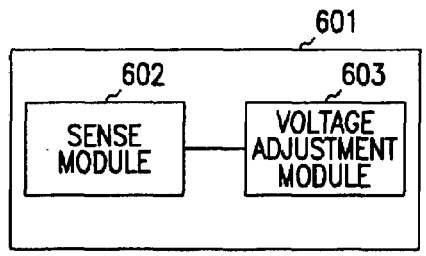
FIG. 6 is a block diagram that illustrates a DC-DC converter, consistent with an embodiment of the present invention.

FIG. 6 illustrates in block diagram form the structure of one embodiment of the present invention. A DC-DC converter 601 comprises a sense module 602. operable to sense a current drawn from the DC-DC converter. The DC-DC converter module 601 is also operable via a voltage adjustment module 603 to adjust the voltage provided from the DC-DC converter such that the voltage is at a maximum current voltage level when the current drawn is at a maximum load current level and the voltage is at a minimum current voltage level when the current drawn is at a minimum load current level. The voltage adjusting is implemented in various embodiments of the invention in software executing on a processor, or in hardware. In further embodiments of the invention, the DC-DC converter module is operable to supply a substantially linear voltage response with respect to current drawn between the maximum load current level and the minimum load current level. The minimum load current level is selected in some embodiments of the invention to be the minimum current drawn by a load device having a minimum current draw of greater than no current.

Figure 7:
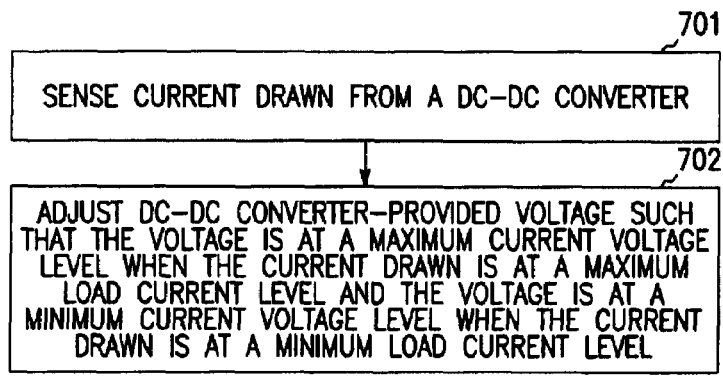
FIG. 7 is a flowchart that illustrates a method of providing a voltage from a DC-DC converter that varies dependent on the current drawn from the DC-DC converter, consistent with an embodiment of the present invention.

FIG. 7 is a flowchart that broadly illustrates an exemplary method consistent with the present invention. At 701, the current drawn from a DC-DC converter is sensed. At 702, the DC-DC converter's provided voltage is adjusted such that the voltage is at a maximum current voltage level when the current drawn is at a maximum load current level, and the voltage is at a minimum current voltage level when the current drawn is at a minimum load current level.

Figure 8:
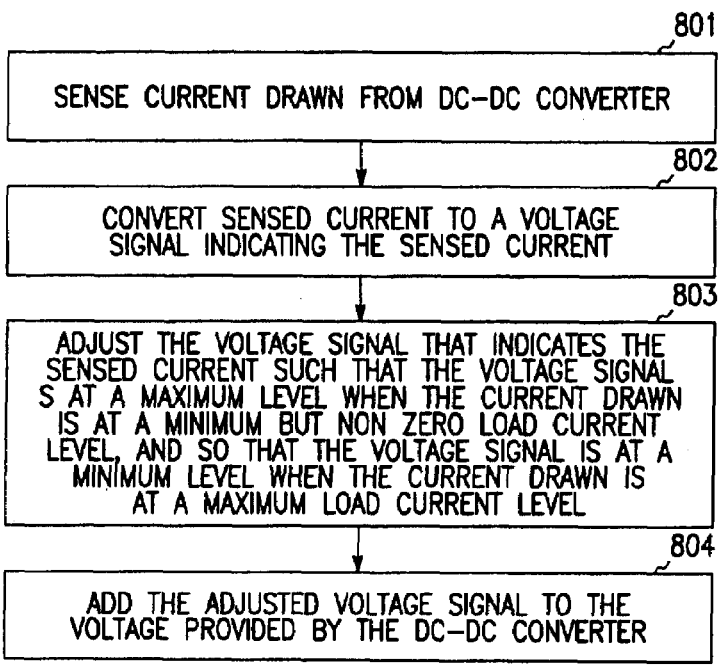
FIG. 8 is a flowchart that illustrates a method of providing a voltage from a DC-DC converter that varies dependent on the current drawn from the DC-DC converter, consistent with an embodiment of the present invention.

FIG. 8 is a flowchart that illustrates a more detailed method of adaptive voltage positioning in a DC-DC converter, consistent with an embodiment of the present invention. At 801, the current drawn from the DC-DC converter is sensed. At 802, the sensed current is converted into a voltage signal indicating the sensed current. At 803, the voltage signal that indicates the sensed current is adjusted so that the voltage signal is at a maximum voltage level when the current drawn is at a minimum but nonzero load current, and the voltage signal is at a minimum voltage level when the current drawn is at a maximum load current level. At 804, the adjusted voltage signal is added to the voltage provided by the DC-DC converter.

It will be apparent to those skilled in the art that the present invention may be implemented in any number of ways, including use of hardware or software-controlled devices. For example, a current sensing resistor may be placed in series with the load output, the signal from which is converted to a corresponding voltage signal provided to an analog circuit that produces a nonlinear voltage response as desired that is then added to the converter reference voltage to produce a nonlinear voltage-current output relationship such as is illustrated at 302 of FIG. 3. Similarly, a voltage signal with a nonlinear voltage response may be added to the output of a DC-DC converter or other voltage source and achieve a like result. Alternatively, digital logic may be employed to produce the same effect, employing in various embodiments such devices as lookup tables, digital-to-analog converters, analog-to-digital converters, and programmable processors.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the invention. It is intended that this invention be limited only by the claims, and the full scope of equivalents thereof.

The invention claimed is:

1. A method of providing a voltage from a DC-DC converter such that the voltage provided varies dependent on the current drawn from the DC-DC converter, comprising:
   sensing a current drawn from the DC-DC converter; and
   adjusting the voltage provided from the DC-DC converter such that the voltage is at a minimum operating voltage level when the current drawn is at a maximum load current level and the voltage is at a maximum operating voltage level when the current drawn is at a minimum operating load current level, wherein the minimum operating load current level is greater than zero current and the provided voltage remains at the maximum operating voltage level if the current drawn is less than the minimum operating load current.

2. The method of claim 1, further comprising adjusting the voltage provided from the DC-DC converter to provide a substantially linear voltage response with respect to current drawn between the maximum load current level and the minimum load current level.

3. The method of claim 1, further comprising adjusting the voltage provided from the DC-DC converter such that the voltage is at the maximum operating voltage level when the current drawn is below the minimum operating load current level.

4. The method of claim 1, wherein the minimum load current level is the minimum current drawn by a known load device having a minimum current draw of greater than no current.

5. The method of claim 1, wherein the minimum load current level is a selected current level between but not including no current and the maximum load current level.

6. The method of claim 1, wherein sensing a current drawn from the DC-DC converter comprises sensing the voltage across a current sensing resistor connected in series with an output of the DC-DC converter.

7. A method of providing a voltage from a DC-DC converter such that the voltage provided varies dependent on the current drawn from the DC-DC converter, comprising:

sensing an output current drawn from the DC-DC converter;

converting the sensed output current to a voltage signal indicating the sensed output current;

adjusting the voltage signal indicating the sensed output current such that the voltage is at a minimum level when the current drawn is at a maximum operating load current level and the voltage is at a maximum level when the current drawn is at a minimum operating load current level, wherein the minimum operating load current level is greater than zero current and the voltage signal indicating the sensed output current remains at the maximum operating voltage level if the current drawn is less than or equal to the minimum operating load current; and adding the adjusted voltage signal indicating the sensed output current to the voltage provided by the DC-DC converter.

8. A DC-DC converter, comprising:

a module operable to sense a current drawn from the DC-DC converter and further operable to adjust the voltage provided from the DC-DC converter such that the voltage is at a minimum operating voltage level when the current drawn is at a maximum load current level and the voltage is at a maximum operating voltage level when the current drawn is at a minimum operating load current level, wherein the minimum operating load current level is greater than zero current and the provided voltage remains at the maximum operating voltage level if the current drawn is less than or equal to the minimum operating load current.

9. The DC-DC converter of claim 8, wherein adjusting the voltage in response to the sensed current is performed via hardware.

10. The DC-DC converter of claim 8, wherein adjusting the voltage in response to the sensed current is performed via software executing on a processor.

11. The DC-DC converter of claim 8, wherein sensing a current drawn from the DC-DC converter comprises measuring the voltage across a current sensing resistor connected in series with an output of the DC-DC converter.

12. The DC-DC converter of claim 8, wherein the module is further operable to provide a substantially linear voltage response with respect to current drawn between the maximum load current level and the minimum load current level.

13. The DC-DC converter of claim 8, wherein the module is further operable to provide a voltage at maximum operating voltage level when the current drawn is below the minimum operating load current level.

14. The DC-DC converter of claim 8, wherein the minimum load current level is the minimum current drawn by a known load device having a minimum current draw of greater than no current.

15. The DC-DC converter of claim 8, wherein the minimum load current level is a selected current level between but not including no current and the maximum load current level.

* * * * *

UNITED STATES PATENT AND TRADEMARK OFFICE
CERTIFICATE OF CORRECTION

| | | |
|---|---|---|
| PATENT NO. | : 7,317,306 B2 | |
| APPLICATION NO. | : 09/476219 | |
| DATED | : January 8, 2008 | |
| INVENTOR(S) | : Fite | |

It is certified that error appears in the above-identified patent and that said Letters Patent is hereby corrected as shown below:

On the Title page, item (54), in column 1, line 1, delete "NONLINEAR" and insert -- NON-LINEAR --, therefor.

In column 1, line 1, delete "NONLINEAR" and insert -- NON-LINEAR --, therefor.

In column 8, line 18, in Claim 13, after "at" insert -- the --.

Signed and Sealed this

First Day of April, 2008

JON W. DUDAS
*Director of the United States Patent and Trademark Office*